United States Patent
Sugimoto et al.

(10) Patent No.: US 10,902,161 B2
(45) Date of Patent: Jan. 26, 2021

(54) METHOD FOR OPTIMIZING COMPONENT TYPE ARRANGEMENT AND APPARATUS FOR OPTIMIZING COMPONENT TYPE ARRANGEMENT

(71) Applicant: FUJI CORPORATION, Chiryu (JP)

(72) Inventors: Koichiro Sugimoto, Anjo (JP); Toshimitsu Honda, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 728 days.

(21) Appl. No.: 15/555,581

(22) PCT Filed: Mar. 6, 2015

(86) PCT No.: PCT/JP2015/056626
§ 371 (c)(1),
(2) Date: Sep. 5, 2017

(87) PCT Pub. No.: WO2016/142988
PCT Pub. Date: Sep. 15, 2016

(65) Prior Publication Data
US 2018/0046736 A1    Feb. 15, 2018

(51) Int. Cl.
*G06F 30/20* (2020.01)
*H05K 13/08* (2006.01)
(Continued)

(52) U.S. Cl.
CPC ............. *G06F 30/20* (2020.01); *G06F 30/17* (2020.01); *G06Q 10/043* (2013.01); *G06Q 50/04* (2013.01);
(Continued)

(58) Field of Classification Search
CPC ...... G06F 30/20; G06F 30/17; G06F 2111/06; G06F 2111/20; H05K 13/085;
(Continued)

(56) References Cited

U.S. PATENT DOCUMENTS 9,137,936 B2 *   9/2015   Katsumi ............ H05K 13/0417

FOREIGN PATENT DOCUMENTS

CN    104125766 A    10/2014
EP    2 775 810 A1    9/2014
(Continued)

OTHER PUBLICATIONS

International Search Report dated May 19, 2015 in PCT/JP2015/056626 filed Mar. 6, 2015.
(Continued)

*Primary Examiner* — Suzanne Lo
(74) *Attorney, Agent, or Firm* — Oblon, McClelland, Maier & Neustadt, L.L.P.

(57) ABSTRACT

A method for optimizing component type arrangement in which multiple component types are optimally disposed on multiple installation positions when an automatic feeder device which automatically loads the component storage tape, a manual feeder device which does not automatically load the component storage tape, and a reel holding device are installed into the installation positions on a common pallet, the method includes a step of determining a portion of the multiple installation positions as a fixed position and fixing the determined automatic feeder device to the fixed position; and an optimizing step of performing a simulation optimally disposing the multiple component types on the multiple installation positions under a condition that the manual feeder device can be moved to an arbitrary installation position other than the fixed position without moving the automatic feeder device from the fixed position.

5 Claims, 5 Drawing Sheets

(51) Int. Cl.
*H05K 13/04* (2006.01)
*G06Q 10/04* (2012.01)
*G06Q 50/04* (2012.01)
*G06F 30/17* (2020.01)
*G06F 111/06* (2020.01)
*G06F 111/20* (2020.01)

(52) U.S. Cl.
CPC ....... *H05K 13/0417* (2013.01); *H05K 13/085* (2018.08); *H05K 13/086* (2018.08); *H05K 13/0857* (2018.08); *G06F 2111/06* (2020.01); *G06F 2111/20* (2020.01)

(58) Field of Classification Search
CPC ............. H05K 13/0857; H05K 13/086; H05K 13/0417; G06Q 10/043; G06Q 50/04
USPC ........................................................... 703/1
See application file for complete search history.

(56) References Cited

FOREIGN PATENT DOCUMENTS

| | | | |
|---|---|---|---|
| EP | 2775810 A1 * | 9/2014 | ......... H05K 13/0419 |
| JP | 11-177281 A | 7/1999 | |
| JP | 11177281 A * | 7/1999 | |
| JP | 2009-130337 A | 6/2009 | |
| JP | 2009130337 A * | 6/2009 | |
| JP | 2014-11368 A | 1/2014 | |
| JP | 2014-236126 A | 12/2014 | |
| JP | 2014236126 A * | 12/2014 | |

OTHER PUBLICATIONS

Extended European Search Report dated Feb. 21, 2018 in Patent Application No. 15884486.0, 16 pages.

* cited by examiner

| SLOT NUMBER | COMPONENT TYPE | FEEDER NAME | FEEDER STATUS |
|---|---|---|---|
| SL1 | | | VARIABLE |
| SL2 | | | VARIABLE |
| SL3 | | ALF1 | FIXED |
| SL4 | | ALF2 | FIXED |
| SL5 | | ALF3 | FIXED |
| SL6 | | ALF4 | FIXED |
| SL7 | | ALF5 | FIXED |
| SL8 | | | VARIABLE |
| SL9 | | | VARIABLE |

FIG. 5

| SLOT NUMBER | COMPONENT TYPE | FEEDER NAME | FEEDER STATUS |
|---|---|---|---|
| SL1 | P6 | M1 | VARIABLE |
| SL2 | P7 | M2 | VARIABLE |
| SL3 | P3 | ALF1 | FIXED |
| SL4 | P2 | ALF2 | FIXED |
| SL5 | P1 | ALF3 | FIXED |
| SL6 | P4 | ALF4 | FIXED |
| SL7 | P5 | ALF5 | FIXED |
| SL8 | P8 | M3 | VARIABLE |
| SL9 | P9 | M4 | VARIABLE |

FIG. 6

| SLOT NUMBER | COMPONENT TYPE | FEEDER NAME | FEEDER STATUS |
|---|---|---|---|
| SL1 | | | VARIABLE |
| SL2 | | | VARIABLE |
| SL3 | | ALL | FIXED |
| SL4 | | ALS1 | FIXED |
| SL5 | | ALS2 | FIXED |
| SL6 | | ALM1 | FIXED |
| SL7 | | ALM2 | FIXED |
| SL8 | | | VARIABLE |
| SL9 | | | VARIABLE |

FIG. 7

| SLOT NUMBER | COMPONENT TYPE | FEEDER NAME | FEEDER STATUS |
|---|---|---|---|
| SL1 | | | VARIABLE |
| SL2 | | | VARIABLE |
| SL3 | P15 | ALL | FIXED |
| SL4 | P11 | ALS1 | FIXED |
| SL5 | P12 | ALS2 | FIXED |
| SL6 | P13 | ALM1 | FIXED |
| SL7 | P14 | ALM2 | FIXED |
| SL8 | | | VARIABLE |
| SL9 | | | VARIABLE |

METHOD FOR OPTIMIZING COMPONENT TYPE ARRANGEMENT AND APPARATUS FOR OPTIMIZING COMPONENT TYPE ARRANGEMENT

TECHNICAL FIELD

The present invention relates to a method for optimizing component type arrangement and an apparatus for optimizing component type arrangement of which an object is improvement of production efficiency and which optimally dispose multiple component types at multiple installation positions when feeder devices are installed on multiple installation positions which are arrayed at a component mounting machine, respectively.

BACKGROUND ART

There are solder printing machines, component mounting machines, reflow machines, board inspection machines, and the like, as facilities for producing a board on which multiple components are mounted. It is common to constitute a board production line by connecting these facilities. Among them, the component mounting machine includes a board conveyance device, a component supply device, a component transfer device, and a control device. As a typical example of the component supply device, there is a feeder device of a type in which a component storage tape storing components in multiple component storage sections respectively is fed. In combination with the feeder device, a reel holding device which rotatably and interchangeably holds a component supply reel around which the component storage tape is wound is used.

Multiple feeder devices and the reel holding devices are disposed at multiple installation positions arrayed in the component mounting machine. The multiple component types of the component which is mounted on the board are disposed at multiple arrayed installation positions. At this time, the production efficiency of the board changes, depending on the arrangement order of the multiple component types. Therefore, a technology for simulating optimization of the component type arrangement has been developed in consideration of movement distance of a mounting head of the component transfer device or the like, and an example thereof is disclosed in PTL 1. In a disposition determination method of a device of PTL 1, a management device determines disposition of multiple feeder devices so that a mounting cycle time (takt time) required for producing one board is the shortest. At this time, differences in types of the multiple feeder devices, a condition of the component type that can be supplied, and the like are taken into consideration (see paragraphs 0026, 0027, and the like of PTL 1).

CITATION LIST

Patent Literature

PTL 1: JP-A-2009-130337

SUMMARY OF INVENTION

Technical Problem

By the way, in order to change a component type supplied from the feeder device, it is necessary to exchange a component supply reel. At this time, in the feeder device of the related art, it is necessary to rewind a component storage tape which is fed out and is being used to the component supply reel and to take out and load a component storage tape from a new component supply reel, which is a cumbersome work. Therefore, in the technique for optimizing component type arrangement of related art including PTL 1, in order to realize the optimized arrangement order of the component types, there is a case where the entire feeder device including the component storage tapes is exchanged instead of exchanging the component storage tapes.

In the method of the related art described above, although it is possible to shorten the direct mounting cycle time foe executing the board production, it takes much time to perform a setup changing work when changing a board type to be produced. Therefore, the technique of PTL 1 is not always a good idea. In particular, recently since there is a tendency to produce small quantities of various types and opportunities for the setup changing work are increased, it is important to optimize the component type arrangement while considering reduction of the setup changing work. In addition, since a large number of feeder devices are required for exchange, the facility cost increases.

In addition, recently, an automatic feeder device (so-called auto loading feeder) having an automatic loading function for automatically loading the component storage tape is developed as aiming at reducing the setup changing work. In the automatic feeder device, when changing the arrangement order of component types, normally, the component storage tape is exchanged, and the entire feeder device is not exchanged. This type of automatic feeder device is preferable to be effectively used since the workability is good and convenience is high when exchanging component storage tapes. When the reduction of the setup changing work described above, the increase in the facility cost, the effective use of the automatic feeder device, or the like is considered, further improvement of the optimization techniques of the component type arrangement is required.

The invention is made in view of the above problems of the background art and a task thereof to be solved is to provide a method for optimizing component type arrangement and an apparatus for optimizing component type arrangement for efficiently using the automatic feeder device having an automatic loading function and for improving production efficiency while considering comprehensively a setup changing work time and a mounting cycle time.

Solution to Problem

In order to solve the problem described above, there is provided a method for optimizing component type arrangement in which a plurality of component types of components are optimally disposed on a plurality of installation positions when an automatic feeder device which has an automatic loading function of automatically loading a component storage tape in which the components are each stored in a plurality of component storage sections if the component storage tape is inserted into the automatic feeder device, a manual feeder device which does not have the automatic loading function, and a reel holding device which rotatably holds a component supply reel around which the component storage tape is wound are installed in the plurality of installation positions which are set to be arrayed on a common pallet equipped in a component mounting machine, the method including: a fixing setting step of determining a portion of the plurality of installation positions as a fixed position and setting so as to install the automatic feeder device to the fixed position; and an optimizing step of performing a simulation for optimally disposing the plurality of component types of the components on the plurality of installation positions under a condition that the manual feeder device can be moved to an arbitrary installation position other than the fixed position without moving the automatic feeder device from the fixed position.

In addition, there is provided a method for optimizing component type arrangement in which a plurality of component types of components are optimally disposed on a plurality of installation positions when a plurality of types of automatic feeder devices which have an automatic loading function of automatically loading a component storage tape in which the components are each stored in a plurality of component storage sections if the component storage tape is inserted into the automatic feeder device and respectively correspond to a component type group which is classified on a difference in the plurality of component types of the components and a reel holding device which rotatably holds a component supply reel around which the component storage tape is wound are installed in the plurality of installation positions which are arrayed on a common pallet equipped in a component mounting machine, the method comprising: a fixing setting step of determining the plurality of installation positions as a fixed position for each type of the automatic feeder device and setting so as to install the plurality types of automatic feeder device in the fixed position for each type thereof; and an optimizing step of performing a simulation optimally disposing the plurality of component types of the components on the plurality of installation positions under a condition that the deposition of the component type belonging to the component type group corresponding in a range of the fixed position for each type is changed without moving the plurality of types of automatic feeder devices from the fixed position for each type.

Advantageous Effects of Invention

In the method for optimizing the component type arrangement according to one embodiment, when a board is produced by using the automatic feeder device and the manual feeder device together, the automatic feeder device is installed at a fixed position and used regularly. Therefore, the automatic feeder device having good workability during a setup changing work can be effectively used. Further, the simulation of optimization of the component type arrangement is performed under the condition that the manual feeder device can be moved to an arbitrary installation position other than the fixed position without moving the automatic feeder device from the fixed position. Accordingly, when the component type at the fixed position is changed, only the reel holding device or the component supply reels are exchanged without exchanging the automatic feeder device, and thus the setup changing work time can be shortened. On the other hand, when the component type at the installation position other than the fixed position is changed, the same setup changing work as that in the related art for exchanging manual feeder device is performed. Accordingly, the shortest mounting cycle time can be realized. Therefore, production efficiency can be improved while the setup changing work time and the mounting cycle time is comprehensively considered.

In addition, in the method for optimizing component type arrangement according to another embodiment, when a board is produced by using multiple types of automatic feeder devices, the fixed position is determined for each type of automatic feeder device and is used regularly. Therefore, multiple types of automatic feeder devices having good workability can be effectively used during the setup changing work. Further, the simulation of optimization of the component type arrangement is performed under the condition that the disposition of the component type is changed in the range of the fixed position for each type without moving the multiple types of the automatic feeder devices. Accordingly, when the component type is changed at the fixed position for each type, only the reel holding device or the component supply reel is exchanged without moving the automatic feeder device, and thus the setup changing work time can be shortened. In addition, the shortest mounting cycle time can be realized. Therefore, production efficiency can be improved while the setup changing work time and the mounting cycle time is comprehensively considered.

DESCRIPTION OF EMBODIMENTS

1. Overall Configuration of Component Mounting Machine 1

Figure 1:
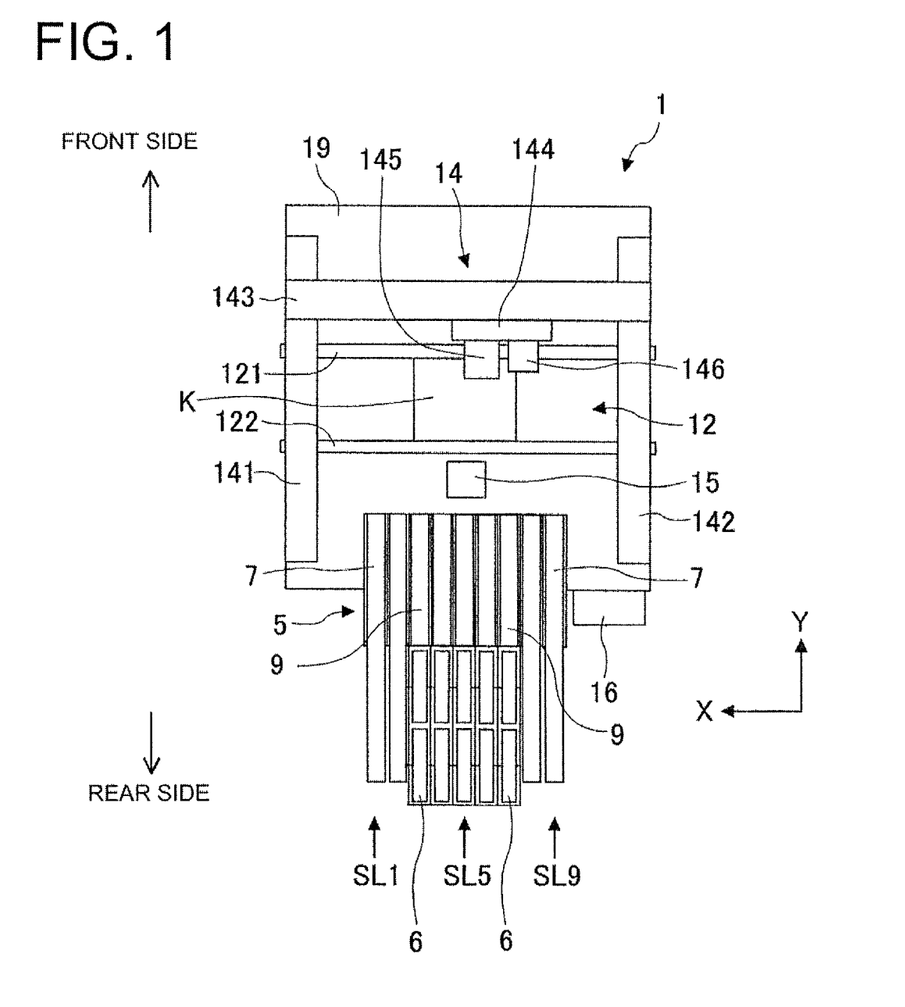
FIG. 1 is a plan view schematically illustrating an overall configuration of a component mounting machine in a simplified manner.

First, an overall configuration of the component mounting machine 1 that performs a method for optimizing component type arrangement according to a first embodiment and a second embodiment of the invention will be described with reference to FIG. 1. FIG. 1 is a plan view schematically illustrating the overall configuration of the component mounting machine 1 in a simplified manner. A direction from the right side to the left side of the page of FIG. 1 is an X-axis direction, in which the board K is carried in and out and a direction from the rear side of a lower side of the page to the front side of an upper side of the page is the Y-axis direction. The component mounting machine 1 is configured by assembling a board conveyance device 12, an attachable and detachable manual feeder device 7, an attachable and detachable automatic feeder device 9, a component transfer device 14, a component camera 15, a control device 16, or the like to a frame 19. The board conveyance device 12, the feeder devices 7, 9, component transfer device 14, and the component camera 15 are controlled by the control device 16, and each performs a predetermined work.

The board conveyance device 12 carries in a board K to a mounting work position, positions and carries out the board K. The board conveyance device 12 is configured by a pair of first and second guide rails 121 and 122, a pair of conveyor belts, a clamping device, and the like. The first and second guide rails 121 and 122 extend in a conveyance direction (X-axis direction) across a center of an upper face of the frame 19 and are assembled to the frame 19 in parallel to each other. A pair of endless annular conveyor belts (not illustrated) is arranged in parallel on an inside of the first and second guide rails 121 and 122, facing each other. The pair of conveyor belts is rotated in a state where both edges of a board K are mounted on the conveyor conveyance surface, respectively, so as to carry the board K in and out the mounting work position which is set at a central section of the frame 19. The clamping device (not illustrated) is provided below the conveyor belt at the mounting work position. The clamping device pushes up a board K and clamps the board K in a horizontal posture and positions a board K at the mounting work position. Accordingly, the component transfer device 14 can perform a mounting operation at the mounting work position.

The manual feeder device 7 and the automatic feeder device 9 sequentially supply components, respectively. Each feeder device 1 and 9 has a flat shape with a small width dimension and is arrayed in first to ninth slots SL1 to SL9 of the common pallet 5 equipped on the frame 19 (to be described in detail below). In FIG. 1, the automatic feeder device 9 is installed in the third to seventh slots SL3 to SL7, and the manual feeder device 7 is installed in the other slots SL1, SL2, SL8, and SL9. A reel holding device 6 detachably attached to the common pallet 5 is disposed behind the automatic feeder device 9. On the other hand, the reel holding device is integrally provided in the manual feeder device 7. In an actual component mounting machine, there are many cases where a greater number of feeder devices 7 and 9 are arrayed.

The component transfer device 14 sucks and picks up a component from, each supply position 94 of multiple feeder devices 7 and 9, conveys the component to the positioned board K and mounts the component. The component transfer device 14 is an XY-robot type device which can horizontally move in the X-axis direction and the Y-axis direction. The component transfer device 14 is configured by a pair of Y-axis rails 141 and 142, a Y-axis slider 143, a mounting head 144, a nozzle tool 145, a board camera 146, and the like. The pair of Y-axis rails 141 and 142 is disposed near to both side faces of the frame 19 and extends in the front-back direction (Y-axis direction). On the Y-axis rails 141 and 142, a Y-axis slider 143 is mounted movably in the Y-axis direction. The Y-axis slider 143 is driven in the Y-axis direction by a Y-axis ball screw mechanism (not illustrated).

The mounting head 144 is mounted so as to be movable in the X-axis direction on the Y-axis slider 143. The mounting head 144 is driven in the X-axis direction by an X-axis ball screw mechanism (not illustrated). The nozzle tool 145 is exchangeably held on the mounting head 144. The nozzle tool 145 has one or multiple suction nozzles that suck components and mount the components on the board K. The board camera 146 is provided on the mounting head 144 side by side with the nozzle tool 145. The board camera 146 images a fiducial mark attached to the board K and detects an accurate position of the board K.

The component camera 15 is provided upward at the center position of the upper face of the frame 19 in the width direction between the board conveyance device 12 and the feeder devices 7 and 9. While the mounting head 144 is moved from the feeder devices 7 and 9 onto the board K, the component camera 15 images the state of the component sucked by the suction nozzle. When an error in the suction posture of the component and a deviation in the rotation angle are determined by the captured image data of the component camera 15, the control device 16 finely adjusts a component mounting operation as necessary, and in a case where mounting thereof is difficult, the control for discarding the component is performed.

The control device 16 holds mounting sequence data, specifying the component type, mounting position, mounting order, adaptable nozzle, and the like of components to be mounted on the board K. The control device 16 controls the component mounting operation according to the mounting sequence data based on captured image data of the board camera 146 and the component camera 15 and detection data of a sensor (not illustrated). In addition, the control device 16 sequentially collects and updates operation condition data such as the production number of the board K of which production is completed, mounting time required for mounting the components, number of occurrences of the component suction error, and the like.

2. Configuration Examples of Automatic Feeder Device 9, Reel Holding Device 6, and Manual Feeder Device 7

Figure 2:
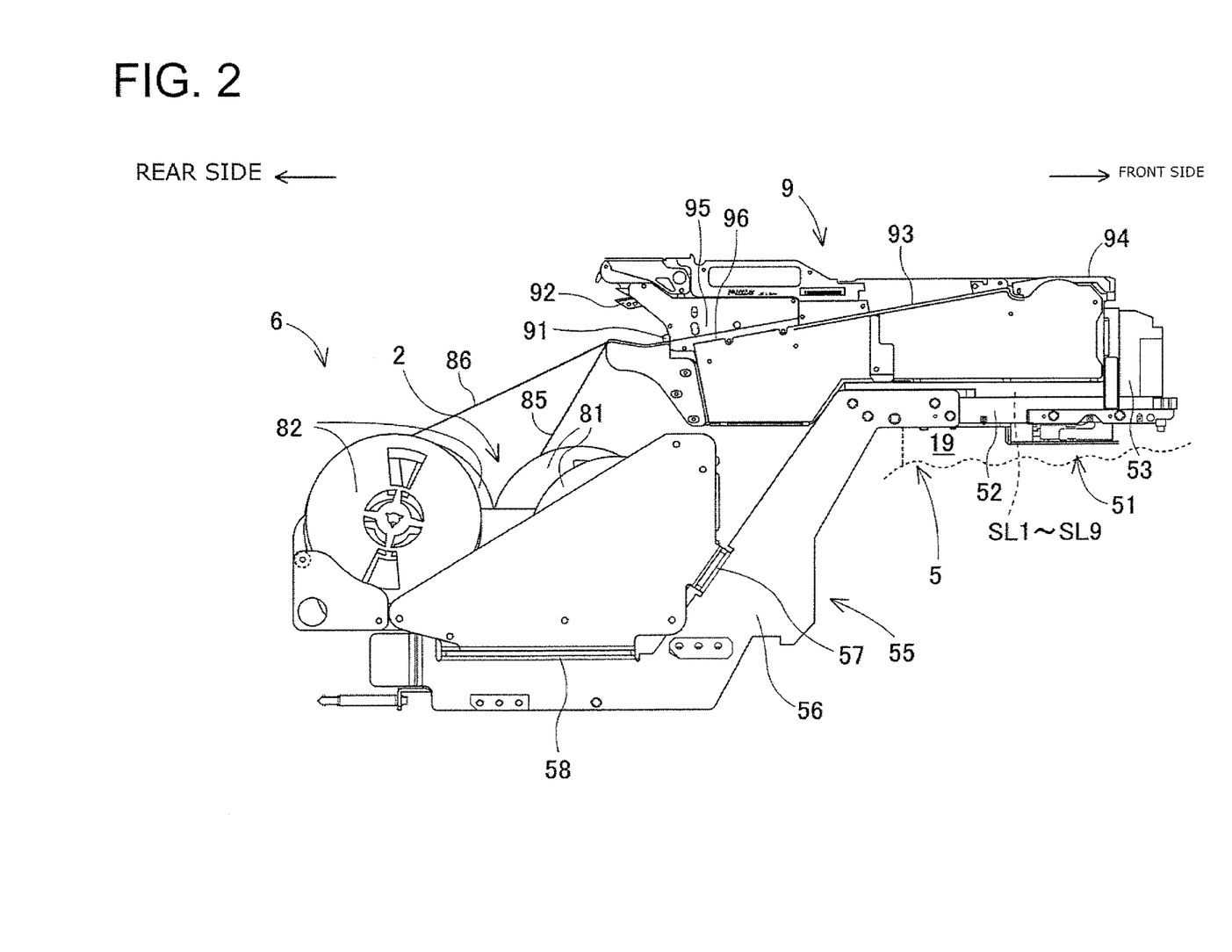
FIG. 2 is a side view illustrating a configuration example of a use state in which an automatic feeder device and a reel holding device are mounted on a common pallet.

Next, configuration examples of the automatic feeder device 9 and the reel holding device 6 will be described. FIG. 2 is a side view illustrating a configuration example of a use state in which the automatic feeder device 9 and the reel holding device 6 are mounted on the common pallet 5.

The common pallet 5 is detachably equipped on the upper side of the frame 19. The invention is not limited thereto, and the common pallet 5 may be fixedly equipped on the upper side of the frame 19. The common pallet 5 has a feeder mounting section 51 and a reel mounting section 55. The feeder-mounting section 51 is formed by providing an upright section 53 on the front side of a substantially rectangular flat surface section 52 and has a substantially L shape in a side view. In the flat surface section 52, nine slots of first to ninth slots SL1 to SL9 extending in the front-back direction are engraved side by side in the width direction. In FIG. 1, the positions in the width direction of the first, fifth, and ninth slots SL1, SL5, SL9 are illustrated. The automatic feeder device 9 is inserted from the rear side of the slots SL1 to SL9 toward the front upright section 53 and is mounted thereon. The first to ninth slots SL1 to SL9 correspond to the installation positions where the feeder devices 7 and 9 are installed.

The automatic feeder device 9 has a tape insertion port 91 in the vicinity of the intermediate height of the rear end thereof and an insertion lever 92 near to the upper portion of the rear end thereof. By raising up an insertion lever 92, the first and second component storage tapes 85 and 86 can be sequentially inserted into the tape insertion port 91. A feeding rail 93 is installed from the tape insertion port 91 of the automatic feeder device 9 toward the upper section of the front end. A supply position 94 is set on the upper face of the vicinity of the front end of the feeding rail 93. A standby position 96 is set on the upper face of the vicinity of the rear section near to the tape insertion port 91 of the feeding rail 93. The inserted first and second component storage tapes 85 and 86 advance to the standby position 96 and are temporarily stopped.

A tape control section 95 is provided above the standby position 96. The tape control section 95 permits to be fed from the standby position 96 of the first component storage tape 85 and causes the second component storage tape 86 to stand by. Further, when the first component storage tape 85 runs out, the tape control section 95 automatically permits to be fed from the standby position 96 of the second component storage tape 86. Therefore, a splicing work for connecting the first and second component storage tapes 85 and 86 is unnecessary. A specific configuration of the tape control section 95 is disclosed in, for example, JP-A-2014-82454.

Further, the automatic feeder device 9 includes a tape feeding mechanism (not illustrated) configured by a servomotor, a sprocket, and the like. When the first component storage tape 85 is inserted to the standby position 96, the automatic feeder device 9 drives the servomotor in the normal rotation. Accordingly, the automatic feeder device 9 automatically feeds and loads the first component storage tape 85 and preparation for production of the board K is completed. In other words, the automatic feeder device 9 has an automatic loading function. The insertion timing of the second component storage tape 86 may be immediately after the first component storage tape 85 is inserted or during the production by the first component storage tape 85.

In addition, upon receiving a discharge instruction, the automatic feeder device 9 drives the servomotor to rotate in the reverse direction. Accordingly, the automatic feeder device 9 discharges a cut tip of the loaded first or second component storage tape 85 or 86 in the direction from the supply position 94 to the tape insertion port 91. In other words, the automatic feeder device 9 has an automatic discharge function. The discharge instruction is instructed from the control device 16 or instructed by pressing a discharge button (not illustrated) attached to the automatic feeder device 9 by an operator. The automatic feeder device 9 includes a tape control section 95 and has an automatic loading function and an automatic discharge function, thereby remarkably reducing the labor of reel exchange work. The applicant of the present application has already filed a detailed configuration example of the automatic feeder device 9 in the international application JP2014/064443, the international application JP2014/083619, and the like.

The reel mounting section 55 of the common pallet 5 is configured by two arm members 56, a front bridge plate 57, a rear bridge plate 58, and the like. The reel mounting section 55 is designed so that one or multiple reel holding devices 6 can be mounted. As described in detail below, two arm members 56 are fixed to rear sections on both sides in the width direction of the feeder mounting section 51, respectively. In the arm member 56, a beginning section thereof extends horizontally rearward, a subsequent section thereof extends obliquely downward and rearward, and an ending section thereof is formed to extend horizontally rearward. The front bridge plate 57 is passed so as to couple the inclined sections of the two arm members 56. A rear bridge plate 58 is passed so as to couple the rear horizontal section of the two arm members 56. The reel holding device 6 is detachably mounted on upper sides of the front bridge plate 57 and the rear bridge plate 58.

The reel holding device 6 rotatably holds the first and second component supply reels 81 and 82 side by side in the front-back direction. The size of the reel holding device 6 in the width direction (direction of reel axial line) is not limited, and one or the multiple first and second component supply reels 81 and 82 are held side by side in the width direction. Therefore, the reel holding device 6 is mounted on the rear side thereof corresponding to one or the multiple automatic feeder devices 9.

When changing the arrangement order of component types disposed in the slots SL1 to SL9 according to the simulation result of optimization, the operator exchanges the reel holding device 6 disposed behind the automatic feeder device 9 or exchanges only the first or second component supply reel 81 of 82. Subsequently, the operator takes out the first and second component storage tapes 85 and 86 from the first and second component supply reels 81 and 82 and inserts the first and second component storage tapes 85 and 86 from the tape insertion port 91 of the automatic feeder device 9 to the standby position 96. Accordingly, the automatic loading function of the automatic feeder device 9 can operate and the first and second component storage tapes 85 and 86 are sequentially fed to the supply position 94.

On the other hand, in the manual feeder device 7, the reel holding device is integrally provided and directly holds the component supply reel. When setting a new component supply reel on the reel holding device of the manual feeder device 7, the operator needs to take out the component storage tape and load the component storage tape into the inside portion of the manual feeder device 7. Therefore, the reel exchange work is troublesome work for the operator. When changing the arrangement order of the component types disposed in the slots SL1 to SL9 according to the simulation result of optimization, the operator usually exchanges the entire manual feeder device 7 together with the reel holding device and thus the reel exchange work is not performed. Since the manual feeder device 7 can be configured based on various known technologies, a detailed description thereof will be omitted.

3. Method for Optimizing Component Type Arrangement in First Embodiment

Figure 3:
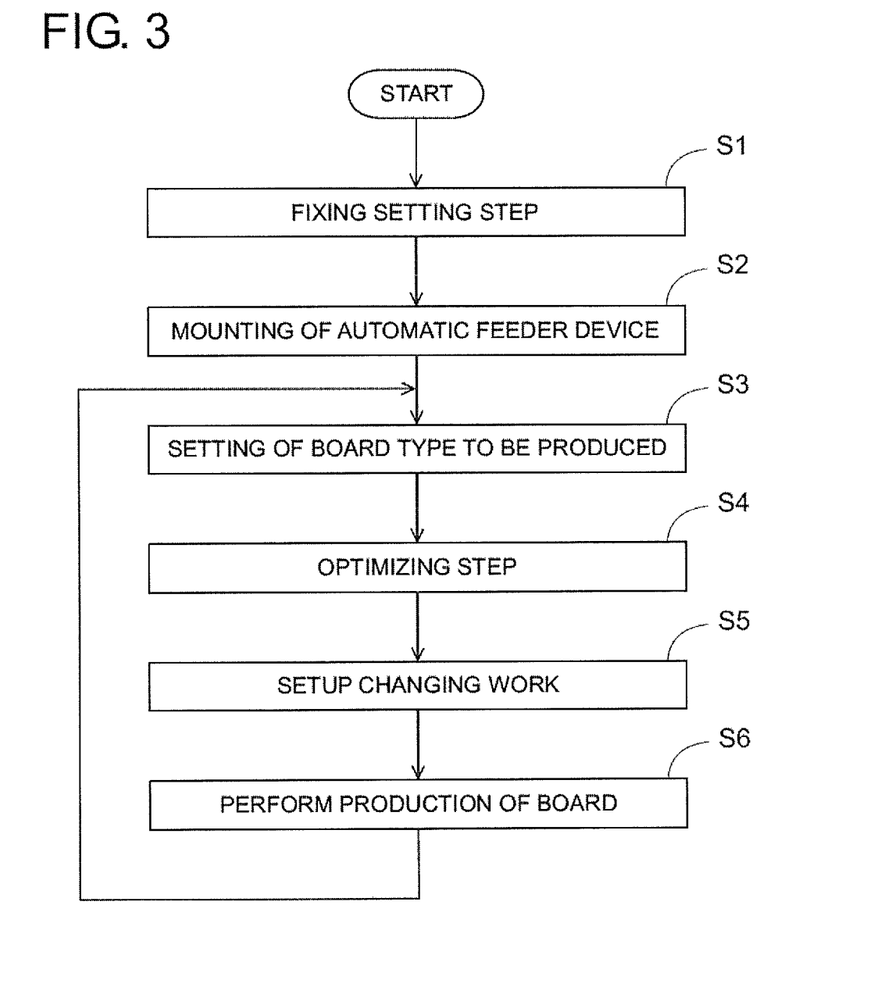
FIG. 3 is a diagram illustrating a calculation processing flow according to a method for optimizing a component type arrangement of the first embodiment together with work items.
Figure 4:
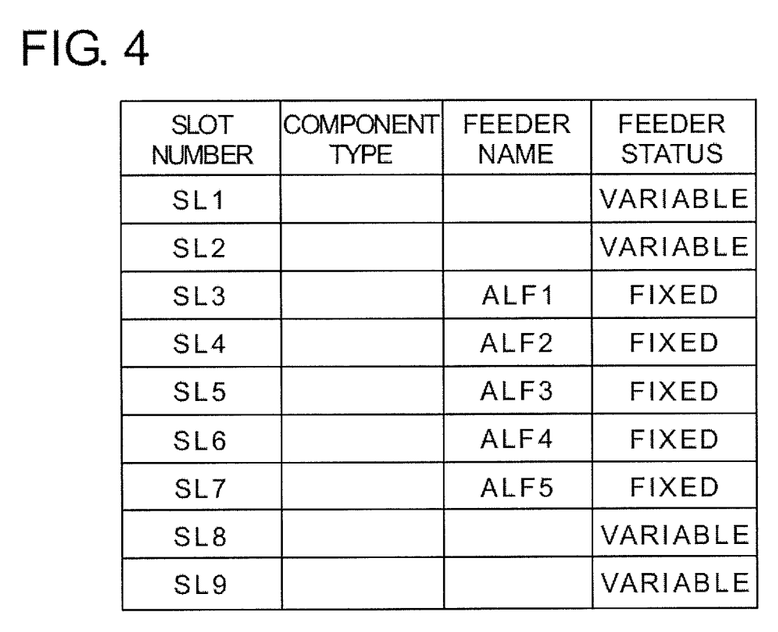
FIG. 4 is a diagram of a feeder arrangement table illustrating an example of calculation processing results obtained in a fixing setting step in a calculation processing flow.

Next, the method for optimizing the component type arrangement according to the first embodiment will be described with reference to FIGS. 3 to 5. The method for optimizing the component type arrangement of the first embodiment is realized by a calculation processing function of a control device (host computer) (not illustrated) for managing a board production line configured by including the component mounting machine 1. The invention is not limited thereto and the optimization method may be realized by the control device 16 of the component mounting machine 1 and a separate computer device sharing various data such as mounting sequence data. FIG. 3 is a diagram illustrating a calculation processing flow according to the method for optimizing component type arrangement of the first embodiment together with work items. In addition, FIG. 4 is a diagram of a feeder arrangement table illustrating an example of calculation processing results obtained in the fixing setting step S1 in the calculation processing flow. Further, FIG. 5 is a diagram of a feeder arrangement table illustrating an example of a calculation processing result obtained in the optimizing step S4.

As a precondition, assume a case where, first, the board K of the first board type B1 is produced at the component mounting machine 1 and then the board K of the second board type B2 is produced. Nine types of components of the first to ninth component types P1 to P9 are mounted on the board K of the first board type B1 and the nine types of components are supplied from the first to ninth component supply reels R1 to R9. Five automatic feeder devices of first to fifth automatic feeder devices ALF1 to ALF5 are prepared as usable automatic feeder devices 9, and a large number (n) of manual feeder devices M1 to Mn are prepared as manual feeder devices 7. The first to seventh component types P1 to P7 can be also supplied from any of the first to fifth automatic feeder devices ALF1 to ALF5 and the manual feeder devices M1 to Mn and the eighth and ninth component types P8 and P9 can be supplied only from the manual feeder devices M2 to Mn.

Figure 5:
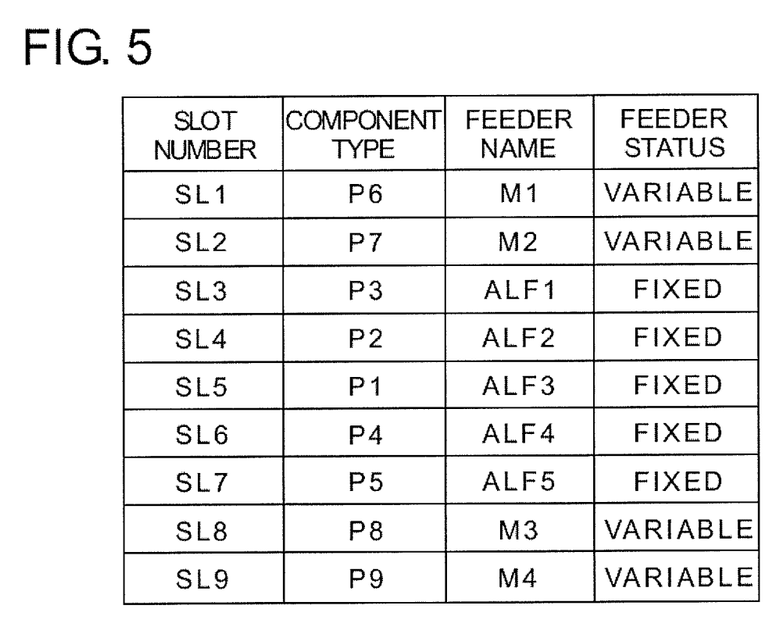
FIG. 5 is a diagram of a feeder arrangement table illustrating an example of calculation processing results obtained in an optimizing step.

The feeder arrangement table illustrated in FIG. 4 and FIG. 5 includes 10 rows and 4 columns, and the first row illustrates indication contents of each column. As illustrated by the slot numbers of the first column, the second to tenth rows correspond to the first to ninth slots SL1 to SL9, respectively. In the second column, component types disposed in the first to ninth slots SL1 to SL9 are indicated. In the third column, a unique name of the feeder device mounted in the first to ninth slots SL1 to SL9 is indicated. In the fourth column, feeder states indicating whether or not the feeder device indicated in the third column is movable are indicated. In other words, "variable" indicates a state in which the movement of the feeder device is permitted, and "fixed" indicates a state in which the feeder device is fixed and movement thereof is prohibited.

In the fixing setting, step S1 of FIG. 3, the control device determines a portion of the first to ninth slots SL1 to SL9 as fixed positions. The control device sets the first to fifth automatic feeder devices ALF1 to ALF5 so as to be installed at fixed positions. In the example of the calculation processing result of FIG. 4, consecutive third to seventh slots SL3 to SL7 are determined as fixed positions. Then, the first automatic feeder device ALF1 is installed in the third slot SL3, the second automatic feeder device ALF2 is installed in the fourth slot SL4, and hereinafter, installation is performed in this order. Accordingly, the first to fifth automatic feeder devices ALF1 to ALF5 are collectively installed in a range of consecutive slots. This setting is performed based on an input setting operation by an operator or the like. In general, the automatic feeder device 9, which is advantageous in reducing reel exchange work, is often supplied to component types that are quickly consumed. Therefore, although it is often advantageous to install the automatic feeder device 9 in the vicinity of the center in the width direction close to the component camera 15 and the board K, this is not the case in all cases.

In the next step S2, the operator actually mounts the first to fifth automatic feeder devices ALF1 to ALF5 in the third to seventh slots SL3 to SL7 so as to match the setting.

In the next step S3, the control device sets the first board type B1 of the board to be produced. This setting is performed based on an input setting operation by an operator and a board production plan that is input and set in advance, and the like. Accordingly, it is determined to dispose the first to ninth component types P1 to P9 in the first to ninth slots SL1 to SL9 and the arrangement position is not determined.

In the next optimizing step S4, the control device performs a simulation of optimally disposing the first to ninth component types P1 to P9 in the first to ninth slots SL1 to SL9. In other words, the first to ninth component types P1 to P9 are disposed in the first to ninth slots SL1 to SL9 so that the position thereof can be changed within a range of the constraint conditions, and the mounting cycle time required for the production of one board is simulated in each disposition condition. Then, the control device adopts the disposition of the first to ninth component types P1 to P9 which minimizes the mounting cycle time. As the constraint condition, the first to fifth automatic feeder devices ALF1 to ALF5 are not moved from the fixed positions of the third to seventh slots SL3 to SL7. Therefore, the eighth and ninth component types P8 and P9 that can be supplied only from the manual feeder devices M1 to Mn are disposed in any one of the first, second, eighth, and ninth, slots SL1, SL2, SL8, and SL9.

In the simulation, the positional relationship between each of the slots SL1 to SL9 and the component camera 15 and the board K, the number of mounting points of the component types P1 to P9 to be mounted on one board K, the performance of the nozzle tool 145, and the like are considered. In general, although component types having a large number of mounting points are disposed in the fifth slot SL5 facing the center of the component camera 15 and the board K, this is not the case in all cases. As to the specific method of simulation, since various techniques are known, a detailed description thereof will be omitted.

By the simulation, the optimal disposition of the first to ninth component types P1 to P9 in the first to ninth slots SL1 to SL9 is determined. In the example of the calculation processing result of FIG. 5, the first to fifth component types P1 to P5 are respectively disposed to the fifth, fourth, third, sixth and seventh slots SL5, SL4, SL3, SL6, and SL7. Accordingly, the component types P3, P2, P1, P4, and P5 to be supplied from the first to fifth automatic feeder devices ALF1 to ALF5 are determined respectively.

On the other hand, the sixth to ninth component types P6 to P9 are disposed in the first, second, eighth, and ninth slots SL1, SL2, SL8, and SL9, respectively. However, the name of the manual feeder device 7 is not determined. The control device searches the first manual feeder device M1 on which the sixth component supply reel R6 for supplying the sixth component type P6 is set and thus sets in order to dispose the sixth component type P6 in the first slot SL1. In a case where there is no manual feeder device 7 in which the sixth component supply reel R6 is set, the control device sets the first manual feeder device M1 which can set the sixth component supply reel R6. Similarly, the control device sets so that the second to fourth manual feeder devices M2 to M4 for supplying the seventh to ninth component types P7 to P9 are disposed in the second, the eighth and the ninth slots SL2, SL8, and SL9 respectively.

As a result of the above, the feeder arrangement table illustrated in FIG. 5 is completed. The control device indicates the completed feeder arrangement table to the operator and instructs the work content of the setup changing work.

In step S5, the operator performs a setup changing work according to the feeder arrangement table. In the setup changing work relating to the first to fifth automatic feeder devices ALF1 to ALF5, the operator sets each of the component supply reels R3, R2, R1, R4, and R5 corresponding to each of component types P3, P2, P1, P4, and P5 in the reel holding device 6 and the reel holding device 6 is mounted behind each of the automatic feeder devices ALF1 to ALF5.

Here, the reel holding device 6 is optimally configured to rotatably hold the five types of component supply reels R3, R2, R1, R4, and R5 in the described arrangement order. This is because, when the operator simply mounts one reel holding device 6 at the time of the setup changing work, the workability is particularly good. In addition, according to the reel holding device 6 that holds multiple types of component supply reels 81 and 82, not limited to five types, the setup changing work relating to the first to fifth automatic feeder devices ALF1 to ALF5 is alleviated.

On the other hand, in the setup changing work relating to the first to fourth manual feeder devices M1 to M4, the operator exchanges the first to fourth manual feeder devices M1 to M4 between the first, second, eighth, and ninth slots SL1, SL2, SL8, and SL9 in which the feeder state is set to be variable to each other. Alternatively, the operator sets the sixth to ninth component supply reels R6 to R9 to the reel holding devices of the first to fourth manual feeder devices M1 to M4 in an outside section of the component mounting machine 1. Then, the operator carries in the first to fourth manual feeder devices M1 to M4 and mounts the first to fourth manual feeder devices M1 to M4 in the slots SL1, SL2, SL8, and SL9.

Upon completion of the setup changing work, in step S6, the control device performs the production of the board K of the first board type B1. When production of a predetermined number of boards K is completed, the control device returns execution of the calculation processing flow to step S3.

Prior to the production of the board K of the next second board type B2, the step S3, the optimizing step S4, and the step S5 are performed again. Even if the board K to be produced is changed from the first board type B1 to the second board type B2, the first to fifth automatic feeder devices ALF1 to ALF5 are not moved from the fixed positions of the third to seventh slots SL3 to SL7. Then, in response to the change of the component type arrangement indicated by the simulation result, only the reel holding device 6 or the component supply reels R1 to R5 are exchanged in the first to fifth automatic feeder devices ALF1 to ALF5. On the other hand, the first to fourth manual feeder devices M1 to M4 are exchanged between the first, second, eighth, and ninth slots SL1, SL2, SL8, and SL9 to each other according to the change in the component type arrangement. Alternatively, the fifth and subsequent manual feeder devices M5 to Mn are carried in and mounted in the first, second, eighth, and ninth slots. SL1, SL2, SL8, and SL9.

4. Mode and Effect of First Embodiment

A method for optimizing component type arrangement of a first embodiment in which multiple component types P1 to P9 of components are optimally disposed on multiple installation positions (first to ninth slots SL1 to SL9) when an automatic feeder device 9 which has an automatic loading function of automatically loading the component storage tape 85 and 86 in which the components are each stored in multiple component storage sections if the component storage tape 85 and 86 is inserted into the automatic feeder device, a manual feeder device 7 which does not have the automatic loading function, and a reel holding device 6 which rotatably holds a component supply reel 81 and 82 around which the component storage tape 85 and 86 is wound are installed in the multiple installation positions which are set to be arrayed on a common pallet 5 equipped on a component mounting machine 1, the method including: a fixing setting step S1 of determining a portion (third to seventh slots SL3 to SL7) of the multiple installation positions as a fixed position and setting so as to install first to fifth automatic feeder devices ALF1 to ALF5 to the fixed position; and an optimizing step S4 of performing a simulation for optimally disposing the multiple component types P1 to P9 of the components on the multiple installation positions under a condition that first to fourth manual feeder devices M1 to M4 can be moved to an arbitrary installation position (first, second, eighth, and ninth slots SL1, SL2, SL8, and SL9) other than the fixed position without moving the first to fifth automatic feeder devices ALF1 to ALF5 from the fixed position.

Accordingly, when the board K is produced using the automatic feeder device 9 and the manual feeder device 7 together, the first to fifth automatic feeder devices ALF1 to ALF5 are installed to the fixed positions (third to seventh slots SL3 to SL7) so as to be used regularly. Therefore, the first to fifth automatic feeder devices ALF1 to ALF5 having good workability can be effectively used during the setup changing work. Further, simulation of optimization of component type arrangement is performed under the condition that the manual feeder device 7 can be moved to an arbitrary installation position other than the fixed position without moving the first to fifth automatic feeder devices ALF1 to ALF5 from the fixed position. Accordingly, when changing the component type at the fixed position, only the reel holding device 6 or the component supply reels R1 to R5 are exchanged without moving the first to fifth automatic feeder devices ALF1 to ALF5, setup changing work time can be shortened. On the other hand, when changing the component type at the installation position other than the fixed position, the same setup changing work as that in the related art for exchanging the manual feeder device 7 is performed. Accordingly, the shortest mounting cycle time can be realized. Therefore, production efficiency can be improved while considering the setup changing work time and the mounting cycle time comprehensively.

In addition, since the first to fifth automatic feeder devices ALF1 to ALF5 are regularly used, the number of the feeder devices 7 and 9 for exchange is reduced. Accordingly, facility cost is suppressed.

Further, the reel holding device 60 rotatably holds first to fifth component supply reels R1 to R5 on which component storage tapes used for the first to fifth automatic feeder devices ALF1 to ALF5 are respectively wound, or multiple types of component supply feels 81 and 82. Then, in the fixing setting step S1, the first to fifth automatic feeder devices ALF1 to ALF5 are set so as to be collectively installed in consecutive ranges (third to seventh slots SL3 to SL7) of multiple slots.

Accordingly, the operator may mount a smaller number of reel holding devices 6 than the number of the first to fifth automatic feeder devices ALF1 to ALF5 during the setup changing work. Therefore, the setup changing work relating to the first to fifth automatic feeder devices ALF1 to ALF5 is further reduced.

The method for optimizing the component type arrangement according to the first embodiment can also be implemented as an optimization device. In other words, an apparatus for optimizing component type arrangement according to the embodiment, which optimally disposes multiple component types P1 to P9 of components on multiple installation positions (first to ninth slots SL1 to SL9) when an automatic feeder device 9 which has an automatic loading function of automatically loading the component storage tape 85 and 86 in which the components are each stored in multiple component storage sections if the component storage tape 85 and 86 is inserted, a manual feeder device 7 which does not have the automatic loading function, and a reel holding device 6 which rotatably holds a component supply reel 81 and 82 around which the component storage tape 85 and 86 is wound are installed in the multiple installation positions which are set to be arrayed on a common pallet 5 equipped in a component mounting machine 1, the apparatus comprising a fixing setting section which determines a portion (third to seventh slots SL3 to SL7) of the multiple installation positions as a fixed position and sets so as to install the automatic feeder device 9 to the fixed position; and an optimization section which performs a simulation for optimally disposing the multiple component types of the components on the multiple installation positions under a condition that the manual feeder device 7 can be moved to an arbitrary installation position (first, second, eighth, and ninth slots SL1, SL2, SL8, and SL9) other than the fixed position without moving the automatic feeder device 9 from the fixed position.

The operation and effect of the apparatus for optimizing component type arrangement of this embodiment are the same as those of the method for optimizing component type arrangement of the first embodiment.

5. Method for Optimizing Component Type Arrangement in Second Embodiment

Figure 6:
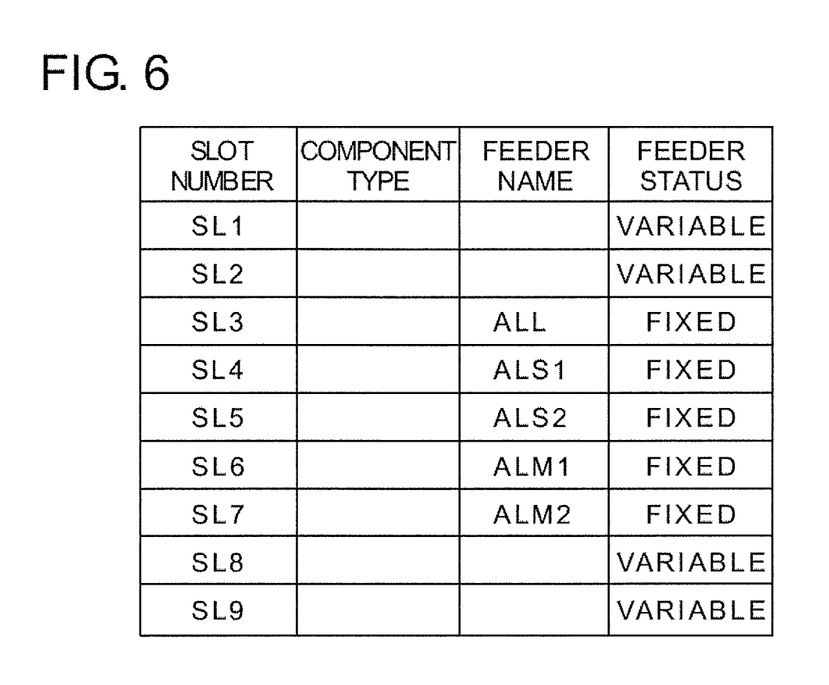
FIG. 6 is a diagram of a feeder arrangement table illustrating an example of the calculation processing results obtained in the fixing setting step when the calculation processing flow of FIG. 3 is executed in a second embodiment.

Next, the method for optimizing the component type arrangement of the second embodiment will be described with reference to FIG. 6 and FIG. 7. The method for optimizing the component type arrangement of the second embodiment is realized by the calculation processing function of the control device as in the first embodiment, and the same applies to the calculation processing flow of FIG. 3. However, the second embodiment is different from the first embodiment in that multiple types of automatic feeder devices are used. FIG. 6 is a diagram of a feeder arrangement table illustrating an example of calculation processing results, obtained in the fixing setting step S1 when the calculation processing flow of FIG. 3 is executed in the second embodiment. Further, FIG. 1 is a diagram of a feeder arrangement table illustrating an example of the calculation processing result obtained in the optimizing step S4 when the calculation processing flow of FIG. 3 is executed in the second embodiment.

As a precondition, assume a case where the component mounting machine 1 first produces the board K of the third board type B3 and then the board K of the fourth board type B4 is produced. On the board K of the third board type B3, five types of components, namely, five types of the components of eleventh to fifteenth component types P11 to P15 are mounted and these five types of components are supplied from the eleventh to fifteenth component supply reels R11 to R15. The eleventh and twelfth component types P11 and P12 are classified into a small-sized component group, the thirteenth and fourteenth component types P13 and P14 are classified into a medium-sized component group, and the fifteenth component type P15 is classified into a large-sized component group.

First and second small-sized automatic feeder devices ALS1 and ALS2, first and second medium-sized automatic feeder devices ALM1 and ALM2, and a large-sized automatic feeder device ALL are prepared as usable feeder devices. The five automatic feeder devices ALS1, ALS2, ALM1, ALM2, and ALL are structurally the same as the automatic feeder device 9 described in the first embodiment and the dimensions thereof are changed in accordance with the size of the components to be supplied.

The first and second small-sized automatic feeder devices ALS1 and ALS2 can supply both the eleventh and twelfth component types P11 and P12 belonging to the small-sized component group. The first and second medium-sized automatic feeder devices ALM1 and ALM2 can supply both the thirteenth and fourteenth component types P13 and P14 belonging to the medium-sized component group. The large-sized automatic feeder device ALL can supply the fifteenth component type P15 belonging to the large-sized component group. However, each of the automatic feeder devices ALS1, ALS2, ALM1, ALM2, and ALL cannot supply component types of different groups of different sizes.

In the fixing setting step S1 in the second embodiment, the control device determines the third to seventh slots SL3 to SL7 as fixed positions for each type of automatic feeder device. Then, the control device sets three types of automatic feeder devices ALS1, ALS2, ALM1, ALM2, and ALL to be installed at fixed positions for each type. In the example of the calculation processing result of FIG. 6, the fourth and fifth slots SL4 and SL5 are set as fixed positions for a small size, and the installation of the first and second small-sized automatic feeder devices ALS1, ALS2 is set. In addition, the sixth and seventh slots SL6 and SL7 are determined as fixed positions for a medium size, and the installation of the first and second medium-sized automatic feeder devices ALM1 and ALM2 is set. Further, the third slot SL3 is determined at a fixed position for a large size and the installation of the large-sized automatic feeder device ALL is set.

In the next step S2, the operator actually mounts five automatic feeder devices ALL, ALS1, ALS2, ALM1, and ALM2 in the third to seventh slots SL3 to SL7 so as to match the setting.

In the next step S3, the control device sets the third board type B3 of the board to be produced. Accordingly, it is determined to dispose the eleventh to fifteenth component types P11 to P15 in the third to seventh slots SL3 to SL7. Then, it is confirmed that the large-sized fifteenth component type P15 is disposed in the third slot SL3 to which the large-sized automatic feeder device ALL is fixed. To the other eleventh to fourteenth component types P11 to P14, the arrangement position is not determined.

In the next optimizing step S4, the control device disposes the eleventh to fourteenth component types P11 to P14 in the fourth to seventh slots SL7 to SL7 within the range of the constraint condition so that the position can be changed and under each disposition condition simulates the mounting cycle time required for the production of one board. The control device adopts the disposition of the eleventh to the fourteenth component types P11 to P14 which minimizes the mounting cycle time. As the constraint condition, the four small-sized and medium-sized automatic feeder devices ALS1, ALS2, ALM1, and ALM2 are not moved from the fixed positions of the fourth to seventh slots SL4 to SL7.

According to the constraint condition, two ways such as a case where the small-sized eleventh component P11 is disposed in the fourth slot SL4 and the small-sized twelfth component P12 is disposed in the fifth slot SL5, and conversely a case where the eleventh component P11 is disposed in the fifth slot SL5, and the twelfth component P12 is disposed in the fourth slot SL4 are considered. Similarly, two ways such as a case where the medium-sized thirteenth component P13 is disposed in the sixth slot SL6 and the medium-sized fourteenth component P14 is disposed in the seventh slot SL7 and conversely a case where the thirteenth component P13 is disposed in the seventh slot SL7 and the fourteenth component P14 is disposed in the sixth slot SL6 are considered. Therefore, in the second embodiment, the simulation may be performed under all four conditions of two ways×two ways.

By the simulation, the optimization disposition of the fourth to seventh slots SL4 to SL7 of the eleventh to the fourteenth component types P11 to P14 is determined. In an example of the calculation processing result of FIG. 7, the eleventh to fourteenth component types P11 to P14 are disposed in the fourth to seventh slots SL4 to SL7, respectively. Accordingly, the component types P11 to P15 to be supplied from the five automatic feeder devices ALS1, ALS2, ALM1, ALM2, and ALL are respectively determined.

Figure 7:
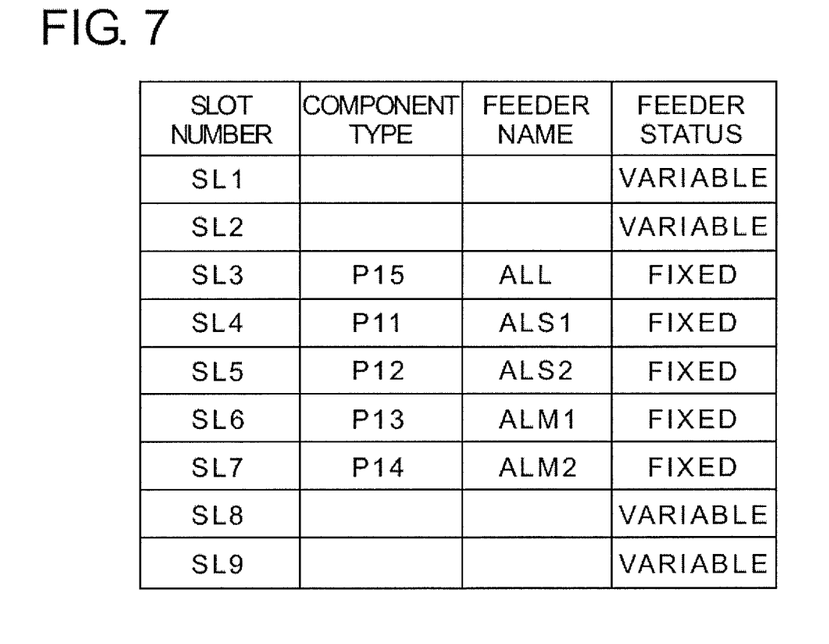
FIG. 7 is a diagram of a feeder arrangement table illustrating an example of calculation processing results obtained in an optimizing step when the calculation processing flow of FIG. 3 is executed in the second embodiment.

As a result of the above, the feeder arrangement table illustrated in FIG. 7 is completed. The control device indicates the completed feeder arrangement table to the operator and instructs the work content of the setup changing work. In step S5, the operator performs a setup changing work according to the feeder arrangement table. The operator sets each component supply reel R15, R11 to R14 corresponding to each component type P15, P11 to P14 to the reel holding device 6 and disposes the reel holding device 6 on the rear side of each automatic feeder device ALL, ALS1, ALS2, ALM1, and ALM2 respectively.

Upon completion of the setup changing work, in step S6, the control device performs the production of the board K of the third board type B3. When production of a predetermined number of boards K is completed, the control device returns execution of the calculation processing flow to step S3.

Prior to the production of the board K of the next fourth board type B4, the step S3, the optimizing step S4, and the step S5 are performed again. Even if the board K to be produced is changed from the third board type B3 to the fourth board type B4, the five automatic feeder devices ALS1, ALS2, ALM1, ALM2, and, ALL are not moved from the fixed position of the third to seventh slots SL3 to SL7. Then, in response to the change in the component type arrangement, only the reel holding device 6 or the eleventh to fifteenth component supply reels R11 to R15 are exchanged to each other.

6. Mode and Effect of Second Embodiment

A method for optimizing component type arrangement according to a second embodiment in which multiple component types of components P11 to P15 are optimally disposed on multiple installation positions (first to ninth slots SL1 to SL9) when a total of five automatic feeder devices ALL, ALS1, ALS2, ALM1, and ALM2 which include three types and have a small size, a medium size, and a large size which have an automatic loading function of automatically loading the component storage tape 85 and 86 in which the components are each stored in multiple component storage sections if the component storage tape 85 and 86 is inserted into the automatic feeder device and respectively correspond to a component type group which is classified based on the difference in the multiple component types of the components and a reel holding device 6 which rotatably holds a component supply reel 81 and 82 around which the component storage tape 85 and 86 is wound are installed in the multiple installation positions which are arrayed on a common pallet 5 equipped in a component mounting machine 1, the method comprising a fixing setting step S1 of determining the multiple installation positions (third to seventh slots SL3 to SL7) as a fixed position for each type of the automatic feeder device (third slots SL3 is a fixed position for large size, fourth and fifth slots SL4 and SL5 are fixed positions for small size, and sixth and seventh slots SL6 and SL7 are fixed positions for medium size) and setting so as to install the multiple types of automatic feeder device in the fixed position for each type thereof; and an optimizing step S4 of performing a simulation for optimally disposing the multiple component types of the components on the multiple installation positions under a condition that the disposition of the component type P11 to P15 belonging to the component type group corresponding in a range of the fixed position for each type is changed without moving the multiple types of automatic feeder devices from the fixed position for each type.

Accordingly, when producing the board K using a total of five automatic feeder devices ALS1, ALS2, ALM1, ALM2, and ALL having three types, fixed positions are set for each type of automatic feeder device and are used regularly. Therefore, multiple types of automatic feeder devices having good workability can be effectively used during the setup changing work. Further, a simulation of optimization of the component type arrangement is performed under condition that the disposition of the component types P11 to P15 is changed in a range of the fixed position for each type (third slot SL3 is for large size, fourth, and fifth slots SL4 and SL5 are for small size, and sixth and seventh slots SL6 and SL7 are for medium size) without moving a total of five automatic feeder devices which include three types. Accordingly, when the component type at the fixed position for each type is changed, the automatic feeder device does not move, only the reel holding device 6 or the eleventh to the fifteenth component supply reels R11 to R15 are exchanged, and thus the setup changing work time can be shortened. In addition, the shortest mounting cycle time can be realized. Therefore, production efficiency can be improved while the setup changing work time and the mounting cycle time is comprehensively considered.

In addition, since five automatic feeder devices ALS1, ALS2, ALM1, ALM2, and ALL are regularly used, the number of exchange feeder devices 7 and 9 is reduced. Accordingly, facility cost is suppressed.

Further, the reel holding device 6 rotatably holds the eleventh to fifteenth component supply reels R11 to R15 around which the component storage tapes used for the five automatic feeder devices ALS1, ALS2, ALM1, ALM2, and ALL are respectively wound, or the multiple types of component supply reels 81 and 82 and in the fixing setting Step S1, five automatic feeder devices ALS1, ALS2, ALM1, ALM2, and ALL are set to be collectively arranged in a continuous range of multiple slots (third to seventh slots SL3 to SL7).

Accordingly, the operator may mount a smaller number of reel holding devices 6 than the five automatic feeder devices ALS1, ALS2, ALM1, ALM2, and ALL during the setup changing work. Therefore, the setup changing work is further reduced.

A method for optimizing the component type arrangement of the second embodiment can also be implemented as an optimization device. In other words, an apparatus for optimizing component type arrangement according to the embodiment, which optimally disposes multiple component types of components on multiple installation positions (first to ninth slots SL1 to SL9) when automatic feeder devices ALL, ALS1, ALS2, ALM1, and ALM2 which include three types and have a small size, a medium size, and a large size and which have an automatic loading function of automatically loading the component storage tape 85 and 86 in which the components are each stored in multiple component storage sections and respectively correspond to a plurality of component type groups which are classified based on the difference in the multiple component types of the components if the component storage tape 85 and 86 is inserted into the automatic feeder device and a reel holding device 6 which rotatably holds a component supply reel 81 and 82 around which the component storage tape 85 and 86 is wound are installed in the multiple installation positions which are set to be arrayed on a common pallet 5 equipped in a component mounting machine 1, the apparatus comprising: a fixing setting section which determines the multiple installation positions (third to seventh slots SL3 to SL7) as a fixed position for each type of the automatic feeder device (third slots SL3 is a fixed position for large size, fourth and fifth slots SL4 and SL5 are fixed positions for small size, and sixth and seventh slots SL6 and SL7 are fixed positions for medium size) and sets the plurality of types of the automatic feeder device to be installed to the fixed position for each type; and an optimization section which performs a simulation for optimally disposing the multiple component types of the components on the multiple installation positions under a condition that the disposition of the component type P11 to P15 belonging to the component type group corresponding in a range of the fixed position for each type is changed without moving the multiple types of automatic feeder devices from the fixed position for each type.

The operation and effect of the apparatus for optimizing component type arrangement of the embodiment are the same as those of the method for optimizing the component type arrangement of the embodiment.

7. Applications and Variations of First and Second Embodiments

The first and second embodiments are examples in which the slots SL1 to SL9 are simplified to nine and in practice, more manual feeder devices 7 and automatic feeder devices 9 are used in many cases. In addition, in the first and second embodiments, the automatic feeder device 9 may not necessarily be collectively installed in the range of consecutive slots. For example, in the second embodiment, there is a case where the components of the eleventh to the fourteenth component types P11 to P14 are mounted in the first cycle of component mounting cycle and the component of the fifteenth component type P15 is mounted in the second cycle of component mounting cycle. In this case, the large-sized automatic feeder device ALL may be installed to be spaced apart from the other automatic feeder devices ALS1, ALS2, ALM1, and ALM2.

Further, in the second embodiment, in a case where more than five types of component types are supplied, in addition to a total of five automatic feeder devices ALL, ALS1, ALS2, ALM1, and ALM2 which include three types, a manual feeder device 7 is used together. In this case, the installation position of the manual feeder device 7 may be varied in the range of the first, second, eighth, and ninth slots SL1, SL2, SL8, and SL9 and optimization simulation may be performed by using the method of the first embodiment in combination together. The various other applications and modifications are possible with the invention.

REFERENCE SIGNS LIST

1: component mounting machine, 5: common pallet, 51: feeder mounting section, 55: reel mounting section, 6: reel holding device, 7: manual feeder device, 81, 82: first and second component supply reel, 85, 86: first and second component storage tapes, 9: automatic feeder device, SL1 to SL9: first to ninth slots (installation position), P 1 to P 9, P 11 to P 15: first to ninth, eleventh to fifteenth component types, ALF1 to ALF5: first to fifth automatic feeder devices, ALS1, ALS2: first and second small-sized automatic feeder devices, ALM1, ALM2: first and second medium-sized automatic feeder devices, ALL: large-sized automatic feeder device, M1 to M4: first to fourth manual feeder devices

The invention claimed is:

1. A method for optimizing component type arrangement in which a plurality of component types of components are optimally disposed on a plurality of installation positions when an automatic feeder device which has an automatic loading function of automatically loading a component storage tape in which the components are each stored in a plurality of component storage sections if the component storage tape is inserted into the automatic feeder device, a manual feeder device which does not have the automatic loading function, and a reel holding device which rotatably holds a component supply reel around which the component storage tape is wound are installed in the plurality of installation positions which are set to be arrayed on a common pallet equipped in a component mounting machine, the method comprising:
    determining a portion of the plurality of installation positions as a fixed position and setting so as to install the automatic feeder device to the fixed position;
    setting a type of board to be produced; and
    based on the type of board to be produced, performing a simulation for optimally disposing the plurality of component types of the components on the plurality of installation positions under a condition that the manual feeder device can be moved to an arbitrary installation position other than the fixed position without moving the automatic feeder device from the fixed position, the simulation taking into account positional relationships between the plurality of installation positions and the board, and a number of mounting points of the plurality of component types of the components to be mounted on the board.

2. A method for optimizing component type arrangement in which a plurality of component types of components are optimally disposed on a plurality of installation positions when a plurality of types of automatic feeder devices which have an automatic loading function of automatically loading a component storage tape in which the components are each stored in a plurality of component storage sections if the component storage tape is inserted into the automatic feeder device and respectively correspond to an component type group which is classified based on a difference in the plurality of component types of the components and a reel holding device which rotatably holds a component supply reel around which the component storage tape is wound are installed in the plurality of installation positions which are arrayed on a common pallet equipped in a component mounting machine, the method comprising:
    determining the plurality of installation positions as a fixed position for each type of the automatic feeder device and setting so as to install the plurality types of automatic feeder device in the fixed position for each type thereof;
    setting a type of board to be produced; and
    based on the type of board to be produced performing a simulation optimally disposing the plurality of component types of the components on the plurality of installation positions under a condition that the disposition of the component type belonging to the component type group corresponding in a range of the fixed position for each type is changed without moving the plurality of types of automatic feeder devices from the fixed position for each type, the simulation taking into account positional relationships between the plurality of installation positions and the board, and a number of mounting points of the plurality of component types of the components to be mounted on the board.

3. The method for optimizing component type arrangement according to claim 1,
    wherein a specific reel holding device rotatable holds a plurality of component supply reels around which the component storage tapes used in a plurality of specific automatic feeder devices are wound respectively, and wherein the setting is made so that the plurality of specific automatic feeder devices are collectively installed in a continuous range of the plurality of installation positions.

4. An apparatus for optimizing component type arrangement, which optimally disposes a plurality of component types of components on a plurality of installation positions when an automatic feeder device which has an automatic loading function of automatically loading a component storage tape in which the components are each stored in a plurality of component storage sections if the component storage tape is inserted into the automatic feeder device, a manual feeder device which does not have the automatic loading function, and a reel holding device which rotatably holds a component supply reel around which the component storage tape is wound are installed in the plurality of installation positions which are set to be arrayed on a common pallet equipped in a component mounting machine, the apparatus comprising:

a control device configured to determine a portion of the plurality of installation positions as a fixed position and set so as to install the automatic feeder device to the fixed position;

set a type of board to be produced; and based on the type of board to be produced, perform a simulation for optimally disposing the plurality of component types of the components on the plurality of installation positions under a condition that the manual feeder device can be moved to an arbitrary installation position other than the fixed position without moving the automatic feeder device from the fixed position, the simulation taking into account positional relationships between the plurality of installation positions and the board, and a number of mounting points of the plurality of component types of the components to be mounted on the board.

5. An apparatus for optimizing component type arrangement, which optimally disposes a plurality of component types of components on a plurality of installation positions when a plurality types of automatic feeder devices which have an automatic loading function of automatically loading a component storage tape in which the components are each stored in a plurality of component storage sections and respectively correspond to a plurality of component type groups which are classified based on the difference in the plurality of component types of the components if the component storage tape is inserted into the automatic feeder device and a reel holding device which rotatably holds a component supply reel around which the component storage tape is wound are installed in the plurality of installation positions which are set to be arrayed on a common pallet equipped in a component mounting machine, the apparatus comprising:

a control device configured to determine the plurality of installation positions as a fixed position for each type of the automatic feeder device and set the plurality of types of the automatic feeder device to be installed to the fixed position for each type;

set a type of board to be produced; and based on the type of board to be produced, perform a simulation for optimally disposing the plurality of component types of the components on the plurality of installation positions under a condition that the disposition of the component type belonging to the component type group corresponding in a range of the fixed position for each type is changed without moving the plurality of types of automatic feeder devices from the fixed position for each type, the simulation taking into account positional relationships between the plurality of installation positions and the board and a number of mounting points of the plurality of component types of the components to be mounted on the board.

* * * * *